United States Patent
Akiyoshi et al.

(10) Patent No.: US 6,908,646 B2
(45) Date of Patent: Jun. 21, 2005

(54) ANISOTROPIC SCATTERING FILM AND LIQUID CRYSTAL DISPLAY USING THE SAME

(75) Inventors: Kazunori Akiyoshi, Tsukuba (JP); Shigeaki Chika, Niihari-gun (JP); Koichi Fujisawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/357,403

(22) Filed: Feb. 4, 2003

(65) Prior Publication Data
US 2003/0175446 A1 Sep. 18, 2003

(30) Foreign Application Priority Data
Feb. 5, 2002 (JP) ........................................ 2002-027913

(51) Int. Cl.$^7$ ............................................ G02F 1/1334
(52) U.S. Cl. ........................ 428/1.3; 428/364; 428/401; 264/1.34; 264/1.9; 264/108; 349/10; 349/86
(58) Field of Search .................... 428/1.1, 1.3–1.31, 428/364, 401; 264/1.34, 1.9, 2.7, 108, 288.4, 290.2; 349/10, 86, 183

(56) References Cited

U.S. PATENT DOCUMENTS

| | | | | |
|---|---|---|---|---|
| 5,275,877 A | * | 1/1994 | Isayev ..................... | 428/299.7 |
| 5,783,120 A | * | 7/1998 | Ouderkirk et al. ......... | 264/1.34 |
| 5,995,183 A | | 11/1999 | Tsuyoshi | |
| 6,497,928 B1 | * | 12/2002 | Sato et al. ................... | 428/1.1 |

FOREIGN PATENT DOCUMENTS

| | | |
|---|---|---|
| JP | 9-297204 A | 11/1997 |
| JP | 11-509014 A | 8/1999 |
| WO | WO 97/41484 A1 | 11/1997 |

\* cited by examiner

*Primary Examiner*—Harold Pyon
*Assistant Examiner*—Sow-Fun Hon
(74) *Attorney, Agent, or Firm*—Sughrue Mion, PLLC

(57) ABSTRACT

An anisotropic scattering film, wherein said film has a sea-island structure comprising a matrix phase consisting of at least one polymeric material, and a dispersed phase consisting of at least one polymeric material, wherein the dispersed phase is rod-like, the dispersed phase substantially orientates to one direction, the refractive index of the dispersed phase in the major axis direction differs from the refractive index of the matrix phase in the corresponding direction, the diameter of the dispersed phase is 200 nm or less, and the length of the dispersed phase is 800 nm or more.

22 Claims, 4 Drawing Sheets

Melt viscosity of resin material (100 sec$^{-1}$)

ANISOTROPIC SCATTERING FILM AND LIQUID CRYSTAL DISPLAY USING THE SAME

BACKGROUND OF THE INVENTION

1. Field of the Invention

The present invention relates to an anisotropic scattering film and a liquid crystal display using the same.

2. Description of the Related Art

In conventional liquid crystal displays, brightness thereof has been reduced to half or less of the original brightness of a back light since an absorption type polarizing plate is used. In use, due to two polarizing plates on the front side and back sides of a liquid crystal panel, light utilization efficiency becomes lower, and the brightness thereof is reduced to 30% to 40% of the original brightness of a back light. Therefore, in order to enhance the light utilization efficiency, there have been trials of converting polarization to overcome these defects, by converting the polarized light absorbed by polarizing plate into the polarized light not absorbed by polarizing plate.

For example, JP-W No.11-509014 discloses a polarized element wherein anisotropic particles having a specific size are arranged in an isotropic material at a specific interval. However, the polarized element has problems that satisfactory scattering strength is not obtained, and controlling the dispersibility of particles is difficult.

JP-A NO.9-297204 discloses an anisotropic scattering element where scattering particles whose aspect ratio is 1 or more, are dispersed with arranging to one direction, in a supporting medium having a refractive index different from the scattering particles. However, the anisotropic scattering element has also problems that satisfactory scattering strength is not obtained, and controlling the dispersibility of anisotropic scattering particles is difficult.

SUMMARY OF THE INVENTION

An object of the present invention is to provide an anisotropic scattering film which has high transmittance and excellent scattering property, and a liquid crystal display having high luminance obtained by using the above-mentioned anisotropic scattering film.

That is, the present invention provides an anisotropic scattering film, wherein (I-1) said film has a sea-island structure which comprises a matrix phase consisting of at least one polymeric material, and a dispersed phase consisting of at least one polymeric material, (I-2) the dispersed phase is rod-like, (I-3) the dispersed phase substantially orientates to one direction, (I-4) the refractive index of the dispersed phase in major axis direction differs from the refractive index of the matrix phase in corresponding direction, (I-5) the diameter of the dispersed phase is 200 nm or less, and the length is 800 nm (0.8 μm) or more.

Figure 1:
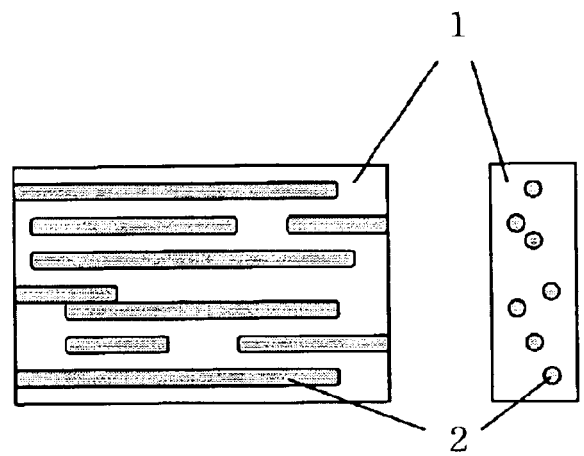
FIG. 1 is a view showing a structure of an anisotropic scattering film.
Figure 2:
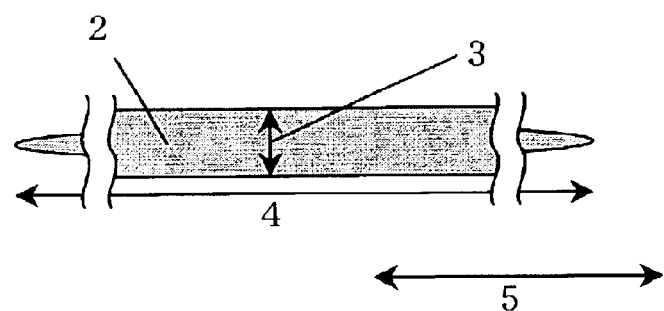
FIG. 2 is a view showing the form, major axis, and minor axis direction of a rod.

1: Anisotropic scattering film
 2: Rod in a film plane and sectional surface
 3: Diameter of a rod in a film plane
 4: Length of a rod in a film plane
 5: Direction of a major axis direction
 6: Polarizing plate
 7: Liquid crystal cell
 8: Back light
 9: Reflection plate or Diffused reflection plate
 10: Retardation plate
 11: Polarized light having a vibration plane perpendicular to paper-plane
 12: Polarized light having a vibration plane parallel to paper-plane

DETAILED DESCRIPTION OF THE INVENTION

The anisotropic scattering film of the present invention is a film having scattering anisotropy to the polarizing component.

The polymeric material used in the present invention is desirably as transparent as possible, and a thermoplastic material having little absorption in the visible-light region (usually 400 nm to 800 nm) is preferable.

Exemplified are: polyolefins such as polyethylene and polypropylene; vinyl polymers, such as polyvinyl chloride; acrylate polymers, such as polymethyl(metha)acrylate; (metha)acrylic-acid polymers; polystyrenes; polyesters, such as PET and PEN; polyamides, such as nylon 6; polycarbonates; urethanes; siloxanes, such as polydimethylsiloxane. These may contain a copolymerization component, or additives, such as an antioxidant, a light stabilizer, a heat stabilizer, a lubricant, a dispersant, a ultraviolet absorbing agent, white pigment, and fluorescent whitening agent, unless the physical properties described above are not injured.

The two kinds of polymeric materials used for the present invention are selected such that the refractive indices between them are different. The difference of the refractive indices between the dispersed phase in major axis direction and the matrix phase in corresponding direction, is preferably 0.05 or more, and more preferably 0.1 or more. When the difference is less than 0.05, the scattering anisotropy of the film may tend to become inadequate.

The rate of the material which forms a dispersed phase is 0.1% by weight or more, and 50% by weight or less, based on the whole polymeric materials, more preferably, 0.1% by weight or more, and 30% by weight or less, and further preferably, 0.1% by weight or more, and 20% by weight or less. When it is less than 0.1% by weight, the scattering strength may tend to become inadequate. When it exceeds 50% by weight, the formation of dispersed phase tends to become insufficient.

The polymeric material which forms a matrix phase is preferably acrylate polymers such as an acrylate resin, or polycarbonate resin.

The polymeric material which forms dispersed phase is preferably selected from those having a satisfactory high Tg or FT than the glass transition temperature of the polymeric material which forms a matrix phase (Tg). Here, FT is a temperature at which the melt viscosity of a material shows 48000 poises when the material heated at a temperature-raising rate of 4° C./minute is extruded from a nozzle having 1 mm of inner diameter under a load of 100 kg/cm$^2$.

When Tg or FT of the dispersed phase is too close to Tg of the matrix phase, setting of the film forming temperature at which the form, orientation and refractive index of the major axis direction of the dispersed phase are maintained, tends to become difficult.

Thus, the temperature difference between the both is preferably 20° C. or more, and more preferably 30° C. or more. When the temperature difference is less than 20° C., the refractive index fall of the major axis direction in the rods is produced, due to disarrangement of the rods, disarrangement of the orientation state, or relaxation of the molecular orientation, by melt in the following film formation process, thus the scattering anisotropy of the film tends to be injured.

Tg or FT may be served as the standard of mold-processing temperature, and the temperature difference between the both materials are preferably 120° C. or less, more preferably 100° C. or less, and further preferably 60° C. or less. When the temperature difference exceeds 120° C., the viscosity difference between the both becomes too large to make the melt-kneading difficult or to constitute the dispersed phase of the rod in the fiber-forming process, thus formation of fiber or film becomes difficult.

When the polyester is an aromatic-polyester type liquid-crystal polymer (hereinafter, may be referred to as LCP), it may be an oligomer, unless the film forming property is not injured.

The aromatic-polyester type liquid-crystal polymer is preferably an aromatic liquid-crystal polyester which has an aromatic ring in the main chain, comprises the following repeating units (A), (B), and (C), and has FT of 170° C. or more, and less than 350° C. More preferably, an aromatic liquid-crystal polyester comprises 50 mole % or more of the repeating unit (A), and substantially equimolar amount of the repeating unit (B) to the repeating unit (C).

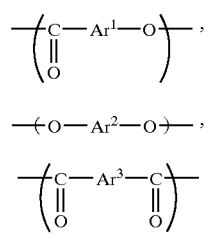 (A)

 (B)

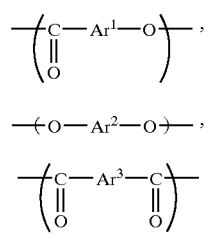 (C)

Ar$^1$ represents a divalent group shown by below formula (A-1) or (A-2).

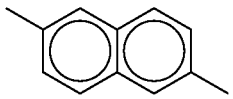 (A-1)

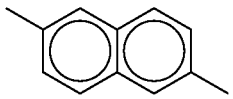 (A-2)

Ar$^2$ represents a divalent group shown by below formula (B-1), (B-2), (B-3), or an alkylene group having 2 to 4 carbon atoms.

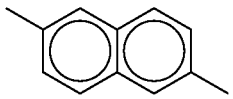 (B-1)

 (B-2)

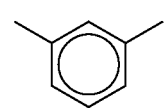 (B-3)

Ar$^3$ represents a divalent group shown by below formula (C-1), (C-2) or (C-3), and X in formula (C-3) represents an alkylene group having 1–3 carbon atoms, —O—, or —S—.

 (C-1)

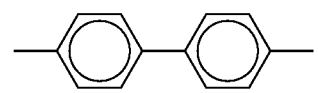 (C-2)

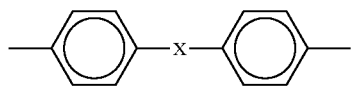 (C-3)

FT is a temperature at which the melt viscosity of a material shows 48000 poises when the material heated at a temperature-raising rate of 4° C./minute is extruded from a nozzle having 1 mm of inner diameter under a load of 100 kg/cm$^2$.

Whole of the rods preferably orientate to substantially one direction. When the disarrangement of orientation exists, satisfactory anisotropy scattering performance can not be shown, or nonuniformity in an anisotropic scattering performance tends to occur.

Orientation of whole rods to substantially one direction means that almost whole of the rods orientate to one direction in observation using an electron microscope. Concretely, rods disarranged over 5° from the orientation axis do not exist, and rods disarranged over 5° is 5% or less based on the whole rods.

Form of the dispersed phase produced in the film of the present invention is preferably controlled, in the below-mentioned spinning process—film forming process, to become rod-like such that the average diameter is sufficiently smaller than the wavelength of visible light, and the mean length is sufficiently long. Preferably, the diameter of the rod is smaller than the wavelength of the light to be used, and more preferably smaller than 50% or less of the wavelength of the light to be used. The length of the rod is preferably the same or more than the wavelength of the light to be used, and more preferably twice or more of the wavelength of the light to be used.

Provided that the wavelength range of visible light is usually 400 nm to 800 nm, the diameter of the rod is 200 nm or less, preferably 10 nm or more, and 200 nm or less, and more preferably, 10 nm or more, and 100 nm or less.

When the diameter exceeds 200 nm, the scattering of diameter direction becomes strong, and when it is less than 10 nm, the refractive-index of length direction tends to fall.

The mean length of the rod is 800 nm or more, and preferably 2000 nm (2 $\mu$m) or more. When it is less than 800 nm, satisfactory scattering strength may not be obtained.

The manufacture method of the anisotropic scattering film of the present invention is explained.

As for the polymeric material, it is suitable to melt-knead at least two kinds of polymeric materials selected form the condition of Tg, the refractive index, etc., so as to finely-disperse the material having the higher mold-processing temperature. It is suitable to perform a melt-kneading by supplying the materials into an apparatus in which the temperature is controllable, and appropriate shearing force can be generated.

The method of melt-kneading is not limited especially. Exemplified are: a method wherein the whole of the materials are supplied together in a mixer equipped with a high shearing blade for stirring set at a desired temperature, or a laboratory scale mill, and melt-kneaded in a predetermined time; or a method wherein a single screw or twin screw extruder equipped with a screw comprising segment of transportation, shearing, deaeration, etc. is set at a predetermined temperature, and materials are melt-kneaded with supplying together, or separately by using a side-feeder.

As a method of continuously manufacturing a lot of the composition, an extruder can be advantageously used, and usually, the composition is obtained as pellets having several millimeters size.

The setting temperature is suitably determined according to the resin materials, and it is suitable to adjust to the molding temperature of the material having the highest Tg or FT. Conditions, such as the optimum temperature, depend upon the characteristics of apparatus, and viscosity characteristics of each polymeric material to be used. As for the temperature, it is preferable to be set in a range of from Tg (or FT)+10° C. to Tg (or FT)+100° C. of the material having the highest Tg or FT.

Outside the temperature range, viscosity difference between the polymeric materials may become too large to knead sufficiently.

As for the stirring or kneading velocity, it is suitable that the rotation speed is such that generates a shear rate of $10^2$ to $10^4$ sec$^{-1}$. Although, the mixing generally progresses with the higher shearing, since the viscosity of a polymeric material has a shear-rate dependency, when the shearing is strengthened, the viscosity difference spreads to make fine dispersion difficult. When the shear rate is outside the range described above, the materials may tend to decompose, due to insufficient melt-kneading, excess of heating, or excess of shearing.

The composition obtained as above can be made into an anisotropic scattering film by a melt-kneading process.

The obtained composition can be formed into an anisotropic scattering film by a melt extrusion method. For example, the composition pellets obtained by melt-kneading at least two kinds of polymeric materials are supplied into an extruder equipped with a film molding die such as a T type die or a hanger coat die, melt-extruded under the appropriate conditions such as temperature, a screw speed, etc., according to said composition, led to a chill roll or a winding-up roll, and formed into a desired film.

According to requirements, rolls for processing mirrorlike surface or surface machining may be used between die winding-up rolls. When film winding-up velocity is fast, the dispersed phase tends to be extended to the winding-up direction.

The film forming process of the above melt-extrusion method may be a process which serves as the above-mentioned melt-kneading process, by providing the role of melt-kneading to the extruder used.

When one polymeric material is dispersed in another polymeric material by melt-kneading, or dispersed into the shape of fine rods in the film forming process, it is suitable to set the temperature and the shearing conditions as $\eta m \geq \eta d$, wherein the melt viscosity of the polymeric material which forms a dispersed phase is $\eta d$, and the melt viscosity of the polymeric material which forms a matrix phase is $\eta m$.

When $\eta m$ is remarkably smaller than $\eta d$, the shearing force may not be sufficiently transmitted to the dispersed phase during the melt-kneading of the polymeric materials, and the dispersion becomes insufficient.

Accordingly, it is preferable that the polymeric materials used in the present invention have a shearing region which satisfies $\eta m \geq \eta d$ in molten state.

Moreover, the composition obtained by melt-kneading is once made into fiber by melt spinning, then the fiber is fixed in the state orientated to one direction, and can be used as the anisotropic scattering film of the present invention.

By this method, films having less thickness ununiformity and orientation ununiformity due to neck-in compared with the above mentioned extrusion method, can be obtained.

For example, the composition obtained by melt-kneading is firstly carried out melt-spinning, in the condition which is suitable for the polymeric material having the highest mold-processing temperature among the polymeric material constituents.

The method of melt spinning is not especially limited. For example, the composition is supplied into an extruder set as a predetermined temperature, and melt-extruded from the die having narrow nozzles, and wound-up at high speed by rolls etc.

The spinning condition changes according to the viscosity characteristics of each polymeric material to be used. For example, as for the temperature, it is preferably set to a temperature of Tg (or FT)+50° C. to Tg (or FT)+100° C. of the polymeric material having the highest Tg or FT.

As for the winding up speed, the winding-up ratio is preferably from 10 to 10000, and more preferably from 100 to 1000.

When the setting temperature or the winding up speed is outside the above range, it becomes difficult that the dispersed phase having suitable rod form in a matrix phase have a structure orientated to one direction.

This melt-spinning process may be a process which serves as the above-mentioned melt-kneading process, by affording a role of melt-kneading to the extruder.

The resultant fiber is made into the shape of a film in the state where the direction was arranged at a temperature which does not affect the form, and the orientation of the dispersed phase in the fiber.

Accordingly, it is preferable that Tg or FT of the polymeric material which forms a dispersed phase is higher than Tg or FT of the polymeric material which forms a matrix phase.

The method of film forming is not especially limited, and a method of heat press processing by a press apparatus which is set to a predetermined temperature is exemplified. The fiber is put in a mold of metal or heat-resistant film in a predetermined amount with arranging, heat pressed at a predetermined condition, and cooled. The mold may be coated with a release agent, according to requirements.

The film forming condition changes according to the viscosity characteristics of each polymeric material to be used as for the temperature, it is preferably not below than Tg of a matrix phase, and not more than Tg+30° C. or FT+20° C. of a dispersed phase. When it is less than the above temperature range, the fiber can not be formed into film, and when it is more than the above temperature range, the form and orientation of a dispersed phase may be disarranged, or the refractive index in a dispersed phase may be lowered due to relaxation of the molecular orientation, and the scattering anisotropy of film tends to become insufficient.

As for the pressure of press processing, it is preferably from 0.1 kgf/cm² to 100 kgf/cm², and more preferably from 0.1 kgf/cm² to 50 kgf/cm². When it is less than 0.1 kgf/cm², fiber borders may remain or air bubbles may be contained when it is more than 100 kgf/cm², form, and orientation of the dispersed phase may become distorted.

Time of the pressing process depends largely on a press apparatus, but it is a time to give sufficient heat and pressure for film formation of the polymeric materials of the present invention, and not to generate deformation or decomposition.

As for a cooling, it is preferable to cool rapidly with holding the pressure. It is also suitable to transfer it from a heat press apparatus to a cold press apparatus with holding in a mold, in a short time.

As the film forming method, exemplified a method in which fiber is put in order with affording suitable tension, and sandwiched between rolls or belt rolls in a predetermined condition. The rolls or belt rolls are preferably those having mirrorlike-surface by chromium plating. Since roll processing corresponds to performing continuously heating, pressurizing, and cooling processes in press molding, the rolls are preferably combination of at least two or more.

The roll temperature is preferably set to a range of from not below than Tg of a matrix phase, and not more than Tg+30° C. or FT+20° C. of a dispersed phase. When it is less than the above temperature range, the fiber may not be formed into a film, and when it is more than the above temperature range, the form and orientation of a dispersed phase may be disarranged, or the refractive index in a dispersed phase may be lowered due to relaxation of the molecular orientation, and the scattering anisotropy of film tends to become insufficient.

The suitable linear pressure of roll changes according to the roll length, it can not be said in general, but it may be set in a range where the fiber borders do not remain or air bubbles are not contained, and the form or orientation of the dispersed phase is not distorted. Moreover, the circumferential speed of roll is not especially limited so long as deformation or decomposition is not generated, and sufficient heat and pressure are given for processing.

This film-forming process may be a process which serves as the above-mentioned melt-spinning process, by affording a role of winding-up apparatus to the rolls to be used. Furthermore, it may be a process in which the steps of from material supply to film-formation are carried out continuously, by affording a role of melt-kneading to the extruder used in the step of melt-spinning.

The thickness of the light scattering film is not especially limited, but it is preferably 1 to 500 μm, and more preferably 20 to 200 μm. When it is less than 1 μm, the light scattering may not be sufficient, and when it is more than 500 μm, the light transmission may not be sufficient.

The anisotropic scattering film may be a laminated film comprising 2 or more kinds of films.

A liquid crystal display using the above-mentioned anisotropic scattering film will be explained.

The display comprising a liquid crystal panel having a polarizing plate at least on the front surface side, an anisotropic scattering film above mentioned, a light guide, and a reflection plate or diffuse reflection plate piled in this order. The transmission axis of the above-mentioned anisotropic scattering film and the transmission axis of the above-mentioned liquid crystal panel being approximately parallel. It is preferable that a retardation plate, particularly, a ¼ wavelength plate is placed between the light guide and the above-mentioned reflection plate, from the standpoint of effective utilization of light. The light guide is included in a back light device, and examples of the back light device include a side type back light device and a direct-under type back light device which effect illumination through a light guide from a light source.

Then, the polarization conversion in liquid crystal panel is explained.

Figure 5:
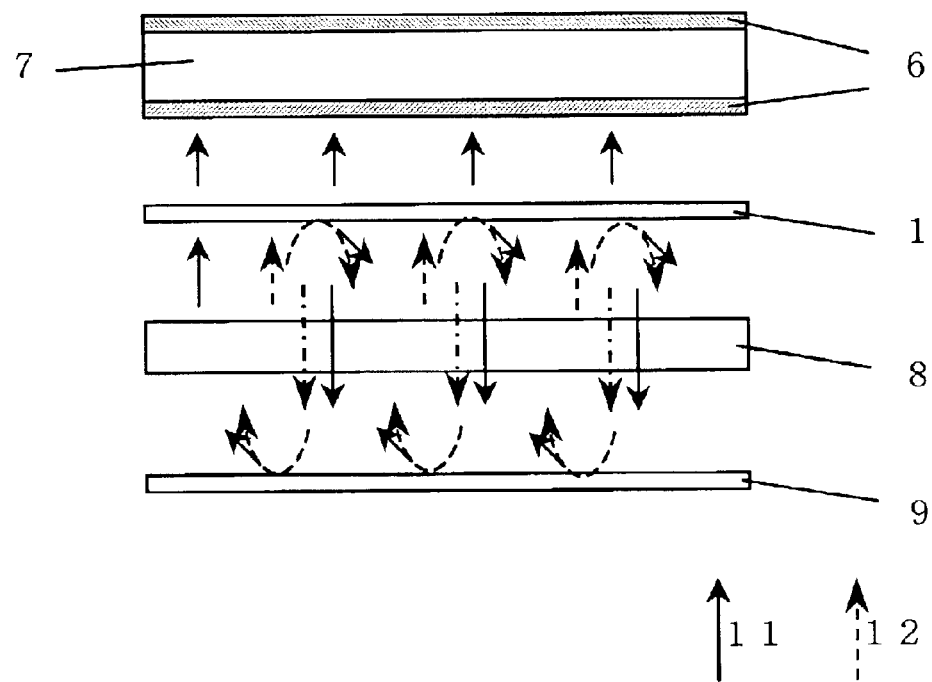
FIG. 5 is a principle figure showing the operation of a liquid crystal display.

As shown in FIG. 5, light emitted from a back light is composed of orthogonally crossing polarized lights, e.g. polarized light having a plane of vibration parallel to the paper surface and light having a plane of vibration vertical to the paper surface.

In the anisotropic scattering film of the present invention, for example, polarized light having a plane of vibration vertical to the paper surface transmits, and polarized light having a plane of vibration parallel to the paper surface is back-scattered. Here, the direction parallel to the plane of vibration of transmitted polarized light is a transmission axis, and the direction vertical to the plane of vibration of scattered polarized light is a scattering axis.

The polarized light back-scattered by an anisotropic scattering film is reflected or scattering-reflected by a reflection plate or a diffuse reflection plate on the back side of the back light, and transmit the anisotropic scattering film again. Thus, the light which had been absorbed by a polarizing plate can be back-scattered and recycled and a liquid crystal display having improved luminance can be obtained.

EXAMPLES

Next, the present invention is explained by the examples, but the scope of the present invention is not restricted by them.

Physical properties were measured as follows.

Total light transmittance: A light source (GOLD LIGHT HL100E produced by Hoya-SCOTT Co.) through a polarizing plate is used as a polarized light source. Total light transmittance is measured by using an integrating sphere (RT-060-SF type produced by Labsphere Co.).

The total light transmittances of a transmission state and a scattering state when polarized light was input normally to an anisotropic scattering film, parallel to the transmission axis and the scattering axis of a sample respectively, were obtained by measuring the quantity of light with a luminancemeter (BM-8, produced by TOPCON Co.) according to JIS K7105.

Transmittance when polarized light having a vibration direction parallel to the transmission axis of an anisotropic scattering film was input, is defined as a transmittance in a transmission state, and transmittance when polarized light having a vibration direction vertical to the transmission axis of an anisotropic scattering film was input, is defined as a transmittance in a scattering state.

Refractive Index:

A several kind of mixed solutions having different refractive indices consisting of toluene and bromonaphthalene were prepared. A sample was immersed in one of the mixed solutions and the refractive index of the solution where the outline disappears was determined as the refractive index of the sample. As for the resin material which forms a dispersed phase, fiber of the resin alone was produced by melt spinning, and the obtained fiber was fixed on a prepared slide. Several drops of the above mixed solution of toluene and bromonaphthalene or the mixed solution of bromonaphthalene and diiodomethane was added thereon, a coverglass was put, and the fiber outline was observed with using a polarizing microscope by inputting polarized light whose transmission axis is parallel to the fiber axis, and the refractive index of the solution when the outline disappears was determined as the refractive index of fiber direction (may be referred to as ne). The refractive index of the mixed solution used was measured at 20° C. with an Abbe refractometer produced by Atago Co., Ltd. Melt viscosity: Measured by CAPIROGRAPH produced by Toyo Seiki seisaku-Sho, Ltd.

Example 1

First, a polymerization method of LCP is shown below.
(1) Melt Polymerization

A 50 liter SUS polymerization vessel having an anchor type stirring blade whose distance of the vessel wall and the stirring blade is short was used. Into this polymerization vessel were charged 20.45 kg (113.5 mol) of p-acetoxybenzoic acid, 1.26 kg (7.6 mol) of terephthalic acid, 5.04 kg (30.4 mol) of isophthalic acid and 10.22 kg (37.8 mols) of 4,4'-diacetoxydiphenyl heated with an oil circulating heating apparatus under nitrogen flow. From the time when the heating medium became to 150° C., the temperature was raised gradually to about 300° C. at a heating rate of about 0.7° C./minutes, acetic acid by-produced during the polycondensation reaction was removed continuously. The temperature of the heating medium was kept at 300 to 310° C., and after 1 hour, sampling was conducted, and the flow temperature was measured to be 235° C.

The reaction was continued further for 1 hour, and the stirring was terminated. The polymer could be easily discharged in a molten state and there was little adhesion to the polymerization vessel and the stirring blade. FT of the resulting polymer was 236° C., and the yield was 20.3 kg (98.1% based on theoretical yield), and an endotherm peak due to liquid-crystal transition was observed at above 265° C.

(2) Solid Phase Polymerization

The resulting polymer was made into particles of 1.0 mm or less, by crushing with using a rough grinder and a pulverizing grinder. The polymer was further heat treated at a final temperature of 260° C. for 5 hours in a furnace under nitrogen atmosphere, and an aromatic liquid crystal polyester having a FT of 309° C. (advanced polymer). In this stage, the weight reduction was 1.3%.

(3) Granulation

The resulting advanced polymer was melt-kneaded by a PCM-30 twin screw extruder manufacture by Ikegai Corp. at a die head temperature of 329° C. and a screw rotation of 100 rpm to obtain an aromatic liquid crystal polyester pellet having a FT of 254° C.

Next, preparation method of an anisotropic scattering film using the above LCP and the evaluation result are shown below.

(Melt-Kneading Process)

Into a Labo-Plasto mill R20R200 manufactured by Toyo Seiki Seisaku-Sho, Ltd. equipped with a 60 cc cylinder (set at at temperature of 270° C.) and a screw, with rotating the screw at a low speed a polycarbonate (Panlite C-1400 produced by Teijin Chemicals Ltd., Tg 155° C., hereinafter may be referred to as PC) 45 g, and the above LCP 5 g were charged together. After charging, the screw rotation was raised to 200 rpm, and when the torque and temperature were stabilized (about 3 minutes after), the kneaded material was taken out.

(Melt-Spinning Process)

About 10 g of the above kneaded material was charged into a cylinder (set at a temperature of 300° C.) of a CAPIROGRAPH manufactured by Toyo Seiki seisaku-Sho, Ltd. said cylinder has an inner diameter of 10 mm equipped with an orifice of 0.5 mm nozzle diameter. After maintaining the heating for 1 minute, the piston was descent at 5 mm/min, strands of a molten resin was extruded the molten strand was wound-up at 120 m/min, and fiber of about 60 $\mu$m diameter was obtained.

(Film Forming Process)

After bundling the resulting fiber and arranging to one direction, it was placed between aluminum sheets having mirrorlike-surface which is coated with a release agent. and further sandwiched by 3 mm plate made of SUS. and pressing was carried out at about 10 kgf/cm$^2$, about 190° C. for 4 minutes. Then, it was moved to a cold press quickly together with the SUS plate. After about 1 minute, a film having a thickness of about 0.1 mm was taken out.

(Micro-Structure Observation)

The composition film of PC and the LCP was embedded in an epoxy resin, and a sliced piece of about 90 nm was prepared by a microtome. The sliced piece was observed by TEM (TEM JEM4000FX manufactured by JAPAN ELECTRON OPTICS LABORATORY CO., LTD.).

Moreover, after carrying out C deposition of this sliced piece, SEM observation was also performed using Hitachi FE-SEM S900. By either of the above observations, it was confirmd that LCP was made into rod-like dispersed phase and orientated along with fiber axis. The diameter of the dispersed phase was about several 10 nm to 100 nm. and the length was several $\mu$m to 10 $\mu$m.

(Scattering Anisotropy Evaluation)

Total light transmittance of the above film was measured. The transmittance in a transmission state was 89.3%. The transmittance in a scattering state was 28.3%. The difference was 61.0%. A high polarized-light dependency (scattering anisotropy) was shown.

Figure 3:
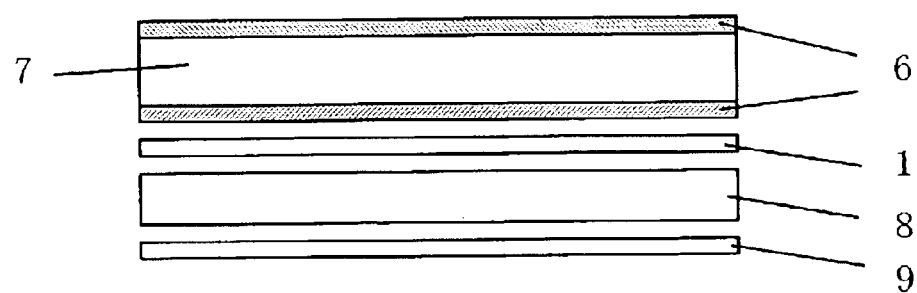
FIG. 3 is a view showing the constitution of a liquid crystal display.
Figure 4:
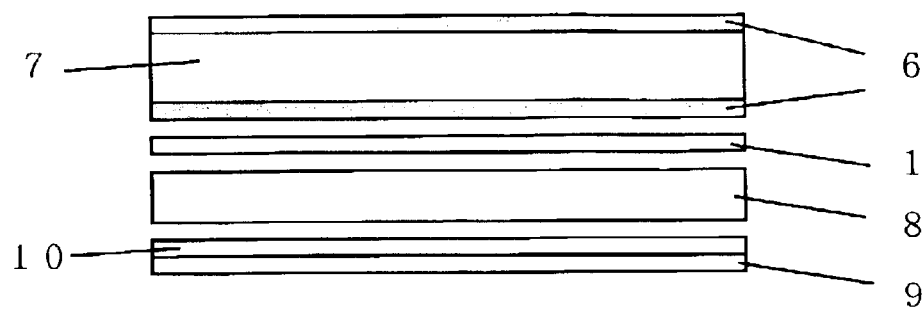
FIG. 4 is a view showing a liquid crystal display.

By constituting the structure shown in FIG. 3 or 4, with using the above film, a liquid crystal display having improved luminance improved can be obtained.

Example 2

A film was produced as the same manner with Example 1, except that an alicyclic polyolefin resin (ARTON G, produced by JSR, Tg 171° C.; hereinafter may be referred to as ARTON) was used as the resin material for matrix phase.

(Micro-Structure Observation)

The composition fiber of the above LCP and the alicyclic polyolefin resin was embedded in an epoxy resin, and a sliced piece of about 90 nm was prepared by a cryo-microtome (−100° C.). After carrying out C deposition of the sliced piece, SEM observation was performed using Hitachi FE-SEM S900, and it was confirmed that LCP was made into rod-like dispersed phase and orientated along with fiber axis. The diameter of the dispersed phase was about several 10 nm. and the length was several µm.

(Scattering Anisotropy Evaluation)

Total light transmittance of the above film was measured. The transmittance in a transmission state was 90.7%. The transmittance in a scattering state was 27.1%. The difference was 63.6%. A high polarized-light dependency (scattering anisotropy) was shown.

By constituting the structure shown in FIG. 3 or 4, with using the above film, a liquid crystal display having improved luminance improved can be obtained.

Example 3

A film was produced as the same manner with Example 1, except that: polymethylmethacrylate (Sumipex EXN, produced by Sumitomo Chemical Co., Ltd., Tg 93° C., hereinafter may be referred to as PMMA) was used as the matrix phase resin material; a liquid crystal polymer (Rodran LC3000 produced by UNITIKA Ltd., FT 183° C., hereinafter may be referred to as Rodran) was used as the dispersed-phase resin material; the melt-kneading was carried out with setting a kneading temperature to 250° C.; the melt-spinning was carried out with setting the spinning temperature to 270° C.; and the film-formation was carried out with setting the press temperature to 160° C.

(Micro-Structure Observation)

The composition fiber of the above LCP and PMMA was embedded in an epoxy resin, and a sliced piece of about 90 nm was prepared by a cryo-microtome (−100° C.). After carrying out C-deposition of the sliced piece, SEM observation was performed using Hitachi FE-SEM S900. and it was confirmed that LCP was made into rod-like dispersed phase and orientated along with fiber axis. The diameter of the dispersed phase was about several 10 nm. and the length was several µm.

(Scattering Anisotropy Evaluation)

Total light transmittance of the above film was measured. The transmittance in a transmission state was 91.0%. The transmittance in a scattering state was 38.3%. The difference was 52.7%. A high polarized-light dependency (scattering anisotropy) was shown.

By constituting the structure shown in FIG. 3 or 4, with using the above film, a liquid crystal display having improved luminance improved can be obtained.

Comparative Example 1

A film was produced as the same manner with Example 1, except that: an alicyclic polyolefin resin (APEL APL6051T, produced by Mitsui-Chemicals Inc., Tg 145° C., hereinafter may be referred to as APEL) was used as the matrix-phase resin material; the melt-kneading was carried out with setting a kneading temperature to 250° C.; the melt-spinning was carried out with setting the spinning temperature to 270° C.; and the film-formation was carried out with setting the press temperature to 140° C.

(Micro-Structure Observation)

The composition fiber of the above LCP and the alicyclic polyolefin resin PMMA was embedded in an epoxy resin, and a sliced piece of about 90 nm was prepared by a cryo-microtome (−100° C.). After carrying out C-deposition of the sliced piece, SEM observation was performed using Hitachi FE-SEM S900, dents of droplet shape in a size of several µm was observed. These dents can be considered as the portion separated off from LCP which forms a dispersed phase, and the shape of the dispersed phase was droplet having a size of about several µm.

(Scattering Anisotropy Evaluation)

Total light transmittance of the above film was measured. The transmittance in a transmission state was 68.2%. The transmittance in a scattering state was 64.9%. The difference was 3.5%. The polarized-light dependency (scattering anisotropy) was not sufficient.

Comparative Example 2

A film was produced as the same manner with Example 1, except that PMMA produced by Sumitomo Chemical Co., Ltd. was used as a resin material for matrix phase, and PC produced by Teijin Chemicals Ltd., was used as a resin material for dispersed phase.

(Micro-Structure Observation)

The composition fiber of the above PMMA and PC was embedded in an epoxy resin, and Ru dyeing was carried out, then a sliced piece of about 90 nm was prepared by a cryo-microtome (−100° C.).

The sliced piece was observed by TEM (TEM JEM4000FX manufactured by JAPAN ELECTRON OPTICS LABORATORY CO., LTD.), and PMMA was formed as rod like dispersed phase having a diameter of several 100 nm to several µm.

(Scattering Anisotropy Evaluation)

Total light transmittance of the above film was measured. The transmittance in a transmission state was 88.2%. The transmittance in a scattering state was 88.9%. The polarized-light dependency (scattering anisotropy) was not observed.

Comparative Example 3

A film was produced as the same manner with Example 1, except that: a TPX resin (TPX RT18, produced by Mitsui-Chemicals Inc., Tg 22° C., hereinafter may be referred to as TPX) was used as a resin material for matrix phase; the melt-spinning was carried out with setting the spinning temperature to 270° C.; and the film-formation was carried out with setting the press temperature to 120° C.

(Micro-Structure Observation)

The composition fiber of the above LCP and TPX was embedded in an epoxy resin, and a sliced piece of about 90 nm was prepared by a cryo-microtome (−100° C.). After carrying out C-deposition of the sliced piece, SEM observation was performed using Hitachi FE-SEM S900, droplet shape dents in a size of several µm was observed. These dents can be considered as the portion separated off from LCP which forms a dispersed phase, and the shape of the dispersed phase was droplet having a size of about several µm.

(Scattering Anisotropy Evaluation)

Total light transmittance of the above film was measured. The transmittance in a transmission state was 78.1%. The transmittance in a scattering state was 76.6%. The difference was 1.5%. The polarized-light dependency (scattering anisotropy) was not sufficient.

Examples 4 to 18

Next, preparation method of an anisotropic scattering film using the above LCP by melt-extrusion film formation and the evaluation result are shown below.

(Melt-Kneading and Granulation Process)

After blending the above LCP and PC produced by Teijin Chemicals Ltd., in a ration shown in Table 2, the blended materials was melt-kneaded with using 30 mmφ twin-screw extruder (PCM-30) manufactured by Ikegai Iron Works, Ltd., with setting the die-head to 315° C., screw rotation speed to 100 rpm. The strand of the blended material extruded from the die head was successively led to a water bath, cooled and cut, to produce the desired composition pellet.

(Film Forming Process)

The composition pellet was melt extruded with using a 20 mmφ single-screw extruder manufactured by Tanabe Plastic Machine equipped with a hanger coat die whose slit width was adjusted to 10 mm and the lip gap to 0.45 or 0.9 mm, at a setting die-head temperature of 300° C., and screw rotation speed of 80 rpm. (The discharging amount was about 5 kg/hr.)

The sheet-like molten composition extruded from the die was wound-up with using a film winding-up apparatus manufactured by Tanabe Plastic Machine at a winding speed shown in Table 2, and the desired films were obtained.

(Micro-Structure Observation)

The film of Example 6 was embedded in an epoxy resin, and a sliced piece of about 90 nm was prepared by a cryo-microtome (−100° C.). After carrying out C-deposition of the sliced piece, SEM observation was performed using Hitachi FE-SEM S900, and it was confirmed that LCP was made into rod-like dispersed phase and orientated along with the film flowing direction (may be sometimes referred to as MD). The diameter of the dispersed phase was about 100 to 200 nm, and the length was several μm.

(Scattering Anisotropy Evaluation)

Total light transmittance of the above film was measured. The transmittance in a transmission state was 80% or more. The transmittance in a scattering state was 60% or less. A high polarized-light dependency (scattering anisotropy) was shown.

By constituting the structure shown in FIG. 3 or 4, with using the above film, a liquid crystal display having improved luminance improved can be obtained.

Examples 19 to 22

(Melt-Kneading and Granulation Process)

After blending LCP (Rodran produced by UNITIKA Ltd.) and PMMA (produced by Sumitomo Chemical Co., Ltd.) in a ratio shown in Table 2, the blended materials was melt-kneaded with using 30 mmφ twin-screw extruder (PCM-30) manufactured by Ikegai Iron Works, Ltd., with setting the die-head to 260° C., screw rotation speed to 100 rpm. The strand of the blended material extruded from the die head was successively led to a water bath, cooled and cut, to produce the desired composition pellet.

(Film Forming Process)

The composition pellet was melt extruded with using a 20 mmφ (single-screw extruder manufactured by Tanabe Plastic Machine equipped with a hanger coat die whose slit width was adjusted to 10 mm and the lip gap to 0.9 mm, at a setting die-head temperature of 260° C., and screw rotation speed of 80 rpm. (The discharging amount was about 5 kg/hr.) The sheet-like molten composition extruded from the die was wound-up with using a film winding-up apparatus manufactured by Tanabe Plastic Machine at a winding speed shown in Table 2, and the desired films were obtained.

(Micro-Structure Observation)

The film of Example 21 was embedded in an epoxy resin, and a sliced piece of about 90 nm was prepared by a cryo-microtome (−100° C.). After carrying out C-deposition of the sliced piece, SEM observation was performed using Hitachi FE-SEM S900, and it was confirmed that LCP was made into rod-like dispersed phase and orientated along with the film flowing direction (may be sometimes referred to as MD). The diameter of the dispersed phase was about 100 to 200 nm, and the length was several μm.

(Scattering Anisotropy Evaluation)

Total light transmittance of the above film was measured. The transmittance in a transmission state was 80% or more. The transmittance in a scattering state was 50% or less. A high polarized-light dependency (scattering anisotropy) was shown.

By constituting the structure shown in FIG. 3 or 4, with using the above film, a liquid crystal display having improved luminance improved can be obtained.

In Table 1, the results of Examples 1–3 and Comparative Examples 1–3 are shown. In table 2, the results of Examples 4–22 are shown.

Figure 6:
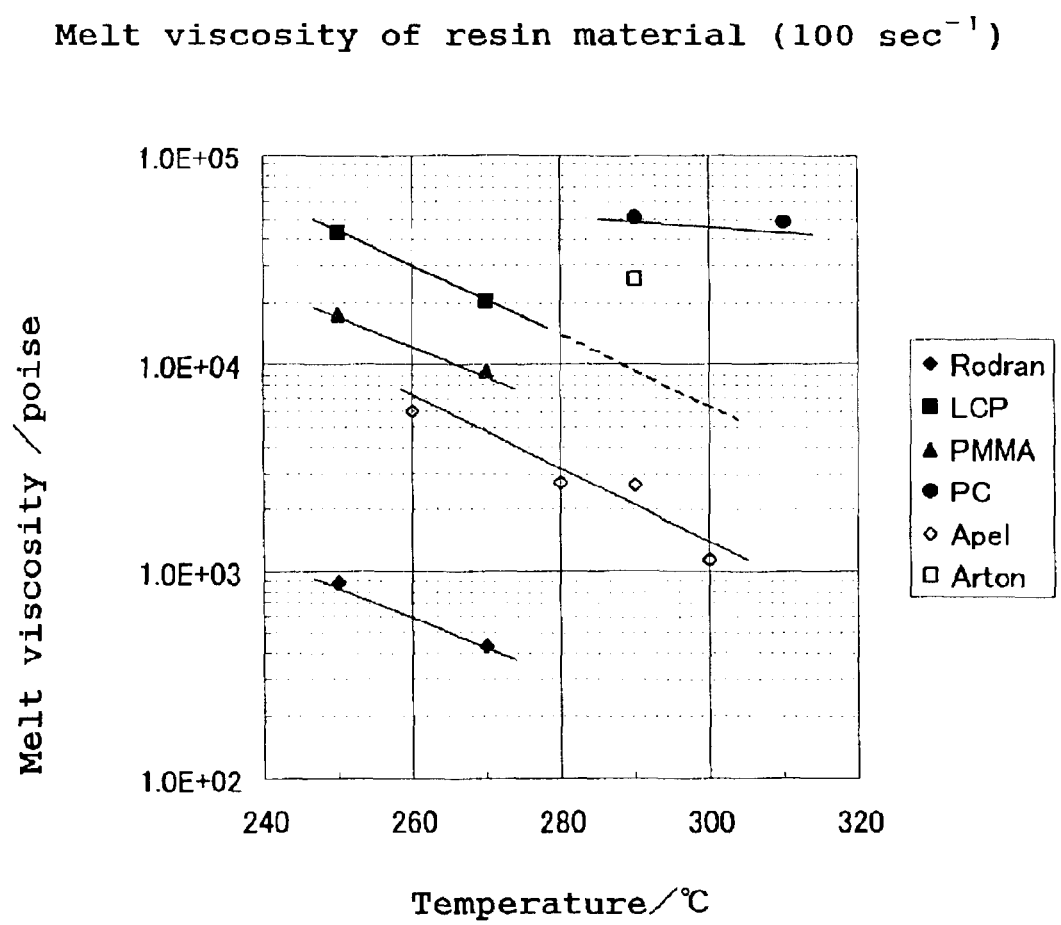
FIG. 6 is a figure showing the relation of the melt viscosity and temperature of a resin material, at a shear rate of 100 sec$^{-1}$.
Figure 7:
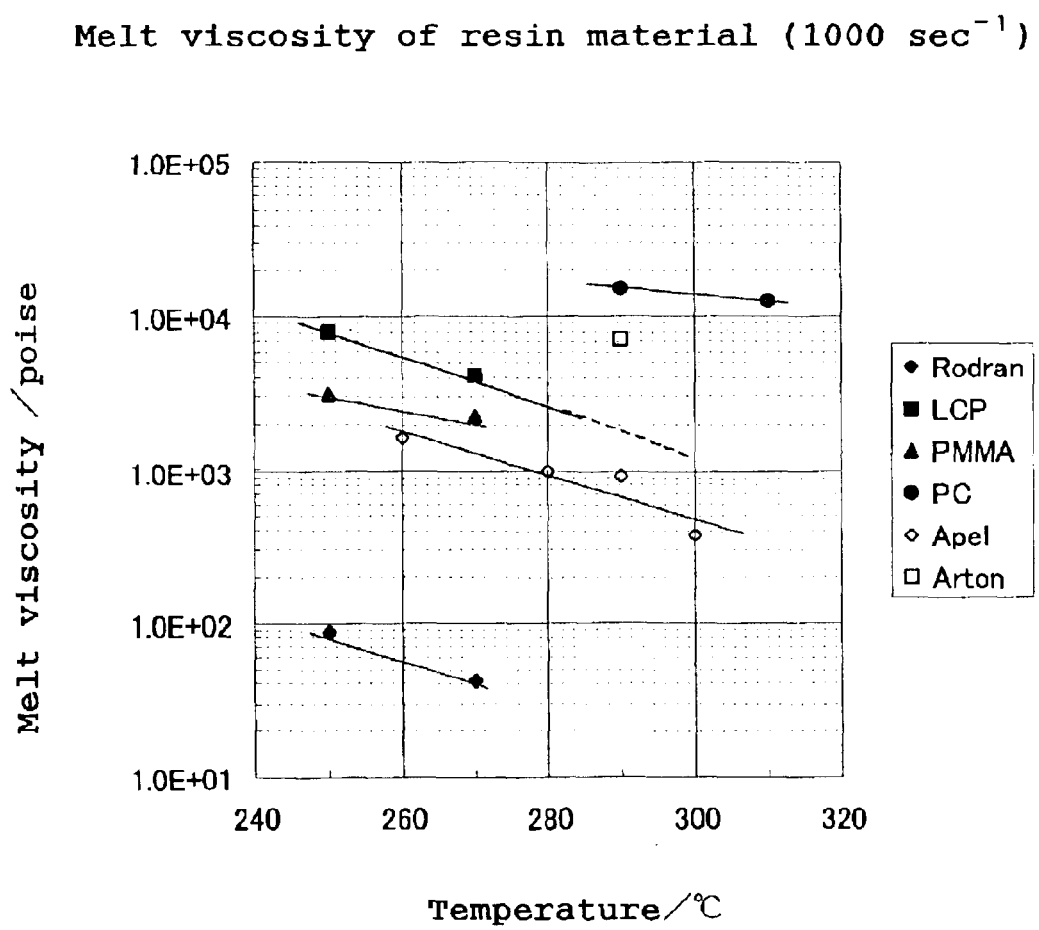
FIG. 7 is a figure showing the relation of the melt viscosity and temperature of a resin material, at a shear rate of 1000 sec$^{-1}$.

The viscosity condition in the Tables was evaluated from Table 4 and FIG. 6, and FIG. 7. The viscosity relation between the resin materials which do not have a measured value at the same temperature can be compared by extending the corresponding points in FIGS. 6 and 7, respectively. For example, in case of LCP and PC, it is recognizable easily that the viscosity of LCP is lower than that of PC by extrapolating the viscosity of LCP to 290° C. In Tables 1–2, the following items were evaluated as below.

1) Shape of Dispersed Phase

○: Most of the dispersed phase have rod-shape, orientate to one direction, diameter of 200 nm or less, and length of 800 nm or more.

x: Most of the dispersed phase do not have rod-shape, or not orientate to one direction.

2) Melt-Viscosity Condition

○: Melt-viscosity of the matrix resin material is higher than that of the dispersed phase resin material, under the temperature and shearing condition at melt-kneading/melt-spinning.

x: Melt-viscosity of the matrix resin material is lower than that of the dispersed phase resin material, under the temperature and shearing condition at melt-kneading/melt-spinning.

3) Scattering Anisotropy

○: Transmittance of a transmission state is larger than that of a scattering state by 10% or more.

x: Difference of the transmittance in a transmission state and that of a scattering state is little. (10% or less)

Table 3 is a list of the refractive index, Tg, and FT of the exemplified resin materials. The differences of refractive index in the Tables were determined from Table 3.

Table 4 shows the result of melt-viscosity measurement of the exemplified resin materials. FIG. 6 shows the relation between melt viscosity and temperature of each resin material, at a shear rate of 100 sec$^{-1}$ obtained from Table 4. FIG. 7 shows the relation between melt viscosity and temperature of each resin material, at a shear rate of 1000 sec$^{-1}$.

The shear rate generated in the step of melt-kneading, spinning, or extrusion film forming of the exemplified resin materials, can be considered to be exist in the range of 100 to 1000 sec$^{-1}$. Moreover, in view of the heat generation by shearing at that time, the resin temperature can be considered to be exist substantially in the range of 270 to 330° C. Accordingly, the melt viscosities of the exemplified resin materials can be compared in this shear rate and temperature range.

TABLE 1

| | Dispersed phase/ Matrix phase | Difference of refractive index (Dispersed phase ne-Matrix phase n) | Setting temperature (Melt-kneading/ Spinning/ Press) (° C.) | Dispersed phase Shape 1) | Tg, FT Dispersed phase Tg, FT (° C.) | Tg, FT Matrix Tg (° C.) | Differ-ence | Melt-visxosity Condition 2) | Total light transmittance Transmission state (%) | Total light transmittance Scattering state (%) | Scattering anisotropy 3) |
|---|---|---|---|---|---|---|---|---|---|---|---|
| Example 1 | LCP/PC | 0.07 | 270/300/190 | ○ | 254 | 155 | 99 | ○ | 89.3 | 28.3 | ○ |
| Example 2 | LCP/ARTON | 0.15 | 270/300/190 | ○ | 254 | 171 | 83 | ○ | 90.7 | 27.1 | ○ |
| Example 3 | Rodran/PMMA | 0.09 | 250/270/160 | ○ | 183 | 93 | 90 | ○ | 91.0 | 38.3 | ○ |
| Com. Ex. 1 | LCP/APEL | 0.13 | 250/270/140 | X | 254 | 145 | 109 | X | 68.2 | 64.9 | X |
| Com. Ex. 2 | PMMA/PC | 0.10 | 270/300/190 | X | 93 | 150 | −57 | ○ | 88.2 | 88.9 | X |
| Com. Ex. 3 | LCP/TPX | 0.21 | 270/270/120 | X | 254 | 22 | 232 | X | 78.1 | 76.6 | X |

TABLE 2

| | Dispersed phase resin material | Dispersed phase Composition (wt. %) | Matrix phase resin material | Difference of refractive index (Dispersed phase ne-Matrix phase n) | Melt kneading setting temperature (° C.) | Film formation by T-die extrusion Die-head setting temperature (° C.) | Lip Gap (mm) | Wind-ing-up speed (m/min) | Dispersed phase shape | Melt-viscosity condition | Total light transmittance Transmission state (%) | Total light transmittance Scattering state (%) | Scattering aniso-tropy |
|---|---|---|---|---|---|---|---|---|---|---|---|---|---|
| Example 4 | LCP | 10 | PC | 0.07 | 315 | 300 | 0.45 | 5 | ○ | ○ | 93.7 | 28.0 | ○ |
| Example 5 | LCP | 10 | PC | 0.07 | 315 | 300 | 0.45 | 8 | ○ | ○ | 93.3 | 45.8 | ○ |
| Example 6 | LCP | 10 | PC | 0.07 | 315 | 300 | 0.45 | 10 | ○ | ○ | 92.5 | 51.8 | ○ |
| Example 7 | LCP | 30 | PC | 0.07 | 315 | 300 | 0.45 | 5 | ○ | ○ | 86.7 | 17.2 | ○ |
| Example 8 | LCP | 30 | PC | 0.07 | 315 | 300 | 0.45 | 8 | ○ | ○ | 88.8 | 22.0 | ○ |
| Example 9 | LCP | 30 | PC | 0.07 | 315 | 300 | 0.45 | 10 | ○ | ○ | 90.8 | 30.8 | ○ |
| Example 10 | LCP | 30 | PC | 0.07 | 315 | 300 | 0.45 | 15 | ○ | ○ | 96.1 | 46.2 | ○ |
| Example 11 | LCP | 10 | PC | 0.07 | 315 | 300 | 0.9 | 5 | ○ | ○ | 90.5 | 25.8 | ○ |
| Example 12 | LCP | 10 | PC | 0.07 | 315 | 300 | 0.9 | 8 | ○ | ○ | 92.9 | 32.5 | ○ |
| Example 13 | LCP | 10 | PC | 0.07 | 315 | 300 | 0.9 | 10 | ○ | ○ | 92.5 | 34.0 | ○ |
| Example 14 | LCP | 10 | PC | 0.07 | 315 | 300 | 0.9 | 15 | ○ | ○ | 92.1 | 35.7 | ○ |
| Example 15 | LCP | 30 | PC | 0.07 | 315 | 300 | 0.9 | 5 | ○ | ○ | 89.5 | 21.2 | ○ |
| Example 16 | LCP | 30 | PC | 0.07 | 315 | 300 | 0.9 | 8 | ○ | ○ | 91.4 | 22.1 | ○ |
| Example 17 | LCP | 30 | PC | 0.07 | 315 | 300 | 0.9 | 10 | ○ | ○ | 92.0 | 25.7 | ○ |
| Example 18 | LCP | 30 | PC | 0.07 | 315 | 300 | 0.9 | 15 | ○ | ○ | 91.1 | 31.4 | ○ |
| Example 19 | Rodran | 10 | PMMA | 0.09 | 260 | 260 | 0.9 | 5 | ○ | ○ | 85.1 | 33.0 | ○ |
| Example 20 | Rodran | 10 | PMMA | 0.09 | 260 | 260 | 0.9 | 8 | ○ | ○ | 91.0 | 37.2 | ○ |
| Example 21 | Rodran | 10 | PMMA | 0.09 | 260 | 260 | 0.9 | 10 | ○ | ○ | 92.6 | 39.3 | ○ |
| Example 22 | Rodran | 10 | PMMA | 0.09 | 260 | 260 | 0.9 | 15 | ○ | ○ | 93.7 | 40.5 | ○ |

TABLE 3

| Resin material | Refractive index n | Refractive index ne | Tg [° C.] | FT [° C.] |
|---|---|---|---|---|
| LCP | — | 1.66 | — | 254 |
| Rodran LC-3000 | — | 1.58 | — | 183 |
| Sumipex EXN (PMMA) | 1.49 | — | 93 | — |
| Panlite C-1400 (PC) | 1.59 | — | 155 | — |
| Arton G | 1.51 | — | 171 | — |
| Apel APL6015T | 1.53 | — | 145 | — |
| TPX RT18 | 1.45 | — | 22 | — |

TABLE 4

| Resin | Shearing rate [sec$^{-1}$] | Temperature[° C.] | | | | | | |
|---|---|---|---|---|---|---|---|---|
| | | 250 | 260 | 270 | 280 | 290 | 300 | 310 |
| Rodran | 100 | 8.72E+02 | — | 4.33E+02 | — | — | — | — |
| LC-3000 | 1000 | 8.72E+01 | — | 4.13E+01 | — | — | — | — |
| LCP | 100 | 4.29E+04 | — | 2.03E+04 | — | — | — | — |
| | 1000 | 7.95E+03 | — | 4.05E+03 | — | — | — | — |
| Sumipex EXN | 100 | 1.74E+04 | — | 9.34E+03 | — | — | — | — |
| (PMMA) | 1000 | 3.17E+03 | — | 2.23E+03 | — | — | — | — |
| Panlite C-1400 | 100 | Unmeasurable | — | Unmeasurable | — | 5.09E+04 | — | 4.82E+04 |
| (PC) | 1000 | ↑ | — | ↑ | — | 1.57E+04 | — | 1.25E+04 |
| Apel | 100 | — | 6.00E+03 | — | 2.70E+03 | 2.60E+03 | 1.12E+03 | — |
| APL6015T | 1000 | — | 1.62E+03 | — | 1.00E+03 | 9.13E+02 | 3.70E+02 | — |
| Arton G | 100 | — | — | — | — | 2.59E+04 | — | — |
| | 1000 | — | — | — | — | 7.26E+03 | — | — |

According to the present invention, an anisotropic scattering film which has high transmittance and excellent scattering property can be provided. The film can be produced easily. A liquid crystal display using said anisotropic scattering film can be provided as well.

What is claimed is:

1. An anisotropic scattering film, wherein
   (I-1) said film has a seal-island structure which comprises a matrix phase consisting of at least one polymeric material, and a dispersed phase consisting of at least one polymeric material,
   (I-2) the dispersed phase is rod-like,
   (I-3) the dispersed phase substantially orientates to one direction,
   (I-4) the refractive index of the dispersed phase in major axis direction differs from the refractive index of the matrix phase in the corresponding direction, and
   (I-5) the diameter of the dispersed phase is 200 nm or less, and the length of the dispersed phase is 800 nm or more,
   wherein the polymeric material forming the dispersed phase has FT of 170° C. or more and less than 350° C., FT being a temperature at which the melt viscosity of the polymeric material is 48000 poises when the material is heated at a temperature-raising rate of 4° C./minute while being extruded from a nozzle having 1 mm of inner diameter under a load of 100 kg/cm$^2$; said polymeric material forming the dispersed phase is an aromatic liquid crystal polyester which has an aromatic ring in the main chain, comprising the following repeating units (A), (B) and (C) shown below, with 50 mole % or more of the repeating unit (A), and substantially an equimolar amount of the repeating unit (B) to the repeating unit (C):

 (A)

 (B)

 (C)

wherein Ar$^1$ represents a divalent group shown by below formula (A-1) or (A-2)

 (A-1)

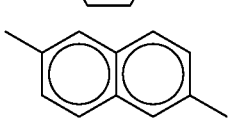 (A-2)

wherein Ar$^2$ represents a divalent group shown by below formula (B-1), (B-2), (B-3) or an alkylene group having 2 to 4 carbon atoms.

 (B-1)

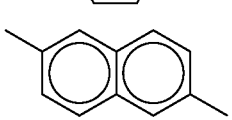 (B-2)

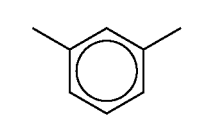 (B-3)

wherein Ar$^3$ represents a divalent group shown by below formula (C-1), (C-2) or (C-3), and X in formula (C-3) represents an alkylene group having 1–3 carbon atoms, —O—, or —S—,

 (C-1)

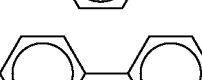 (C-2)

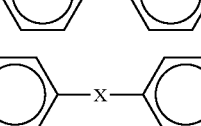 (C-3)

2. An anisotropic scattering film according to claim 1, wherein the glass transition temperature (Tg) or flow temperature (FT) of the polymeric material which forms the dispersed phase is from Tg+20° C. to Tg+120° C., or from FT+20° C. to FT+120° C. of the polymeric material which forms the matrix phase.

3. An anisotropic scattenng film according to claim 1 or 2, wherein the polymeric material which forms the matrix phase is a polycarbonate resin.

4. An anisotropic scattering film according to claim 1 or 2, wherein the polymeric material which forms the matrix phase is an acrylate resin.

5. An anisotropic scattering film according to claim 1 or 2 obtained by the following steps of (II-1) to (II-3),
- (II-1) a step of obtaining a composition in which at least one kind of polymeric material is dispersed in at least one kind of polymeric material having different refractive index,
- (II-2) a step of forming fiber from the composition and making the dispersed phase into rod-shape, and
- (II-3) a step of orientating the fiber to one direction, then forming a film while holding the orientation of the dispersed phase,
- wherein the polymeric material forming the dispersed phase has FT of 170° C. or more and less than 350° C., FT being a temperature at which the melt viscosity of the polymeric material is 48000 poises when the material is heated at a temperature-raising rate of 4° C./minute while being extruded from a nozzle having 1 mm of inner diameter under a load of 100 kg/cm$^2$; said polymeric material forming the dispersed phase is an aromatic liquid crystal polyester which has an aromatic ring in the main chain, comprising the following repeating units (A), (B) and (C) shown below, with 50 mole % or more of the repeating unit (A), and substantially an equimolar amount of the repeating unit (B) to the repeating unit (C):

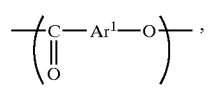
(A)

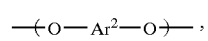
(B)

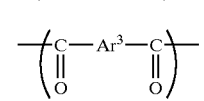
(C)

wherein Ar$^1$ represents a divalent group shown by below formula (A-1) or (A-2)

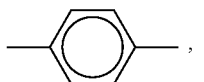
(A-1)

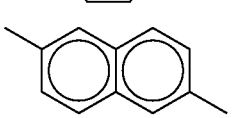
(A-2)

wherein Ar$^2$ represents a divalent group shown by below formula (B-1), (B-2), (B-3) or an alkylene group having 2 to 4 carbon atoms,

(B-1)

(B-2)

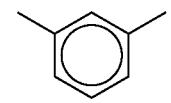
(B-3)

wherein Ar$^3$ represents a divalent group shown by below formula (C-1), (C-2) or (C-3), and X in formula (C-3) represents an alkylene group having 1–3 carbon atoms, —O—, or —S—,

(C-1)

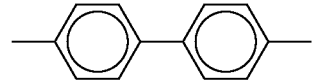
(C-2)

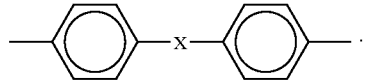
(C-3)

6. An anisotropic scattering film according to claim 5, wherein the step (II-1) is a melt-kneading process.

7. An anisotropic scattering film according to claim 5, wherein the step (II-2) is a melt-spinning process.

8. An anisotropic scattering film according to claim 5, wherein the winding-up ratio defined below in the meltspinning process is 10 to 10000:
Winding-up ratio=(Resin winding-up speed (m/min))/(resin discharging velocity at die exit (m/mm)).

9. An anisotropic scattering film according to claim 5, wherein the step (II-3) is carried out at a temperature of Tg or more of the polymeric material forming the matrix phase, and a temperature of Tg+30° C. or less, or FT+20° C. or less of the polymeric material forming the dispersed phase.

10. An anisotropic scattering film according to claim 5, wherein the step (II-3) is a process in which press molding is carried out while fixing fiber to a frame.

11. An anisotropic scattering film according to claim 5, wherein the step (II-3) is a process in which the fiber is put between rolls or belt rolls set at a temperature of between Tg of the polymeric material which forms the matrix phase, and a temperature of Tg+30° C., or FT+20° C. of the polymeric material which forms the dispersed phase, and molded into a film.

12. A liquid crystal display, comprising an anisotropic scattering film wherein
- (I-1) said film has a sea-island structure which comprises a matrix phase consisting of at least one polymeric material, and a dispersed phase consisting of at least one polymeric material,
- (I-2) the dispersed phase is rod-like,
- (I-3) the dispersed phase substantially orientates to one direction, (I-4) the refractive index of the dispersed phase in major axis direction differs from the refractive index of the matrix phase in the corresponding direction, and (I-5) the diameter of the dispersed phase is 200 nm or less, and the length of the dispersed phase is 800 nm or more, wherein the polymeric material forming the dispersed phase has FT of 170° C. or more and less than 350° C., FT being a temperature at which the melt viscosity of the polymeric material is 48000 poises when the material is heated at a temperature-raising rate of 4° C./minute while being extruded from a nozzle having 1 mm of inner diameter under a load of 100 kg/cm$^2$; said polymeric material forming the dispersed phase is an aromatic liquid crystal polyester which has an aromatic ring in the main chain, comprising the following repeating units (A), (B) and (C) shown below, with 50 mole% or more of the repeating unit (A), and substantially an equimolar amount of the repeating unit (B) to the repeating unit (C):

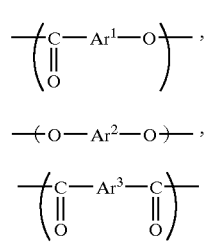
(A)

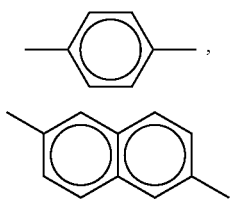
(B)

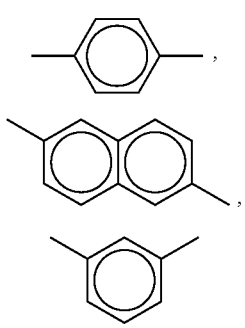
(C)

wherein Ar$^1$ represents a divalent group shown by below formula (A-1) or (A-2)

(A-1)

(A-2)

wherein Ar$^2$ represents a divalent group shown by below formula (B-1), (B-2), (B-3) or an alkylene group having 2 to 4 carbon atoms, (B-1)

(B-2)

(B-3)

wherein Ar$^3$ represents a divalent group shown by below formula (C-1), (C-2) or (C-3), and X in formula (C-3) represents an alkylene group having 1–3 carbon atoms, —O—, or —S—,

(C-1)

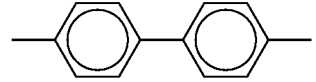
(C-2)

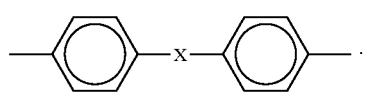
(C-3)

13. A liquid crystal display according to claim 12, wherein the glass transition temperature (Tg) or flow temperature (FT) of the polymeric material which forms the dispersed phase is from Tg+20° C. to Tg+120° C., or from FT+20° C. to FT+120° C. of the polymeric material which forms the matrix phase.

14. A liquid crystal display according to claims 12 or 13, wherein the polymeric material which forms the matrix phase is a polycarbonate resin.

15. A liquid crystal display according to claims 12 or 13, wherein the polymeric material which forms the matrix phase is an acrylate resin.

16. A liquid crystal display according to claims 12 or 13 obtained by the following steps of (II-1) to (II-3), (II-1) a step of obtaining a composition in which at least one kind of polymeric material is dispersed in at least one kind of polymeric material having different refractive index, (II-2) a step of forming fiber from the composition and making the dispersed phase into road-shape islands, and (II-3) a step of orientating the fiber to one direction, then forming a film while holding the orientation of the dispersed phase.

17. A liquid crystal display according to claim 16, wherein the step (II-1) is a melt-kneading process.

18. A liquid crystal display according to claim 16, wherein the step (II-2) is a melt-spinning process.

19. A liquid crystal display according to claim 16, wherein the winding-up ratio defined below in the melt-spinning process is 10 to 10,000:

Winding-up ratio=(Resin winding-up speed (m/min))/ (resin discharging velocity at die exit (m/mm)).

20. A liquid crystal display according to claim 16, wherein the step (II-3) is carried out at a temperature of Tg or more of the polymeric material forming the matrix phase, and a temperature of Tg+30° C. or less, or FT+20° C. or less of the polymeric material forming the dispersed phase.

21. A liquid crystal display according to claim 16, wherein the step (II-3) is a process in which press molding is carried out while fixing fiber to a frame.

22. A liquid crystal display according to claim 16, wherein the step (II-3) is a process in which the fiber is put between rolls or belt rolls set at a temperature of between Tg of the polymeric material which forms the matrix phase, and a temperature of Tg+30° C., or FT+20° C. of the polymeric material which forms the dispersed phase, and molded into a film.

* * * * *